United States Patent
Lopez et al.

(10) Patent No.: US 8,619,646 B2
(45) Date of Patent: Dec. 31, 2013

(54) METHOD AND ARRANGEMENT IN A TELECOMMUNICATIONS SYSTEM

(75) Inventors: Miguel M. Lopez, Solna (SE); Olof Liberg, Stockholm (SE); Xun Qiu, Solna (SE); Måarten Sundberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 308 days.

(21) Appl. No.: 13/033,123

(22) Filed: Feb. 23, 2011

(65) Prior Publication Data

US 2011/0211506 A1 Sep. 1, 2011

Related U.S. Application Data

(60) Provisional application No. 61/308,340, filed on Feb. 26, 2010.

(30) Foreign Application Priority Data

Feb. 18, 2011 (WO) ................. PCT/SE2011/050184

(51) Int. Cl.
*H04B 7/00* (2006.01)

(52) U.S. Cl.
USPC .......................................... 370/310; 370/329

(58) Field of Classification Search
None
See application file for complete search history.

(56) References Cited

U.S. PATENT DOCUMENTS

| 2004/0096012 A1 | 5/2004 | Yang |
| 2007/0041473 A1 | 2/2007 | Chen et al. |
| 2008/0310547 A1 | 12/2008 | Tiirola et al. |
| 2009/0097579 A1 * | 4/2009 | Yeon et al. ..................... 375/260 |

FOREIGN PATENT DOCUMENTS

| WO | 00/10301 A2 | 2/2000 | |
| WO | WO 01/52493 * | 7/2001 | .............. H04L 27/00 |
| WO | 2008149323 A2 | 12/2008 | |

OTHER PUBLICATIONS

Jayalath et al., "A Blind SLM Receiver for PAR-Reduced OFDM," 2002 IEEE 56th Vehicular Technology Conference Proceedings, IEEE Piscataway, NJ, 2002, vol. 1, pp. 219-222.
Garcia et al., "Orthogonal Pilot Sequences for Peak-to-Average Power Reduction in OFDM," IEEE 54th Vehicular Technology Conference, IEEE Piscataway, NJ, Oct. 7-11, 2001, vol. 2, pp. 650-654.

* cited by examiner

*Primary Examiner* — Joseph Avellino
*Assistant Examiner* — Tsung Wu
(74) *Attorney, Agent, or Firm* — Coats and Bennett PLLC (57) ABSTRACT

Methods and arrangements are provided where signaling of the modulation type by means of rotation of the training sequence is provided. For each modulation type, a set of rotation angles is chosen. These sets have no element in common. New training sequences are generated by rotating one original training sequence. The rotation angle that minimizes the PAPR of the transmit signal can be chosen. At the receiver side, knowing the original training sequence, the receiver estimates blindly the rotation angle among the known possible rotation angles. The estimated rotation angle in the receiver maps to a unique modulation type.

12 Claims, 4 Drawing Sheets

METHOD AND ARRANGEMENT IN A TELECOMMUNICATIONS SYSTEM

RELATED APPLICATIONS

This application claims priority to PCT/SE2011/050184 filed Feb. 18, 2011, and U.S. Provisional Patent Application No. 61/308,340, filed Feb. 26, 2010, both of which are incorporated herein by reference in their entireties.

FIELD OF THE INVENTION

The present invention relates to a method and arrangement in a telecommunication system, in particular to a method and an arrangement to jointly reduce Peak to Average Power Ratio (PAPR) and signal modulation for pre-coded Enhanced General Packet Radio Service (EGPRS).

BACKGROUND

Figure 1:
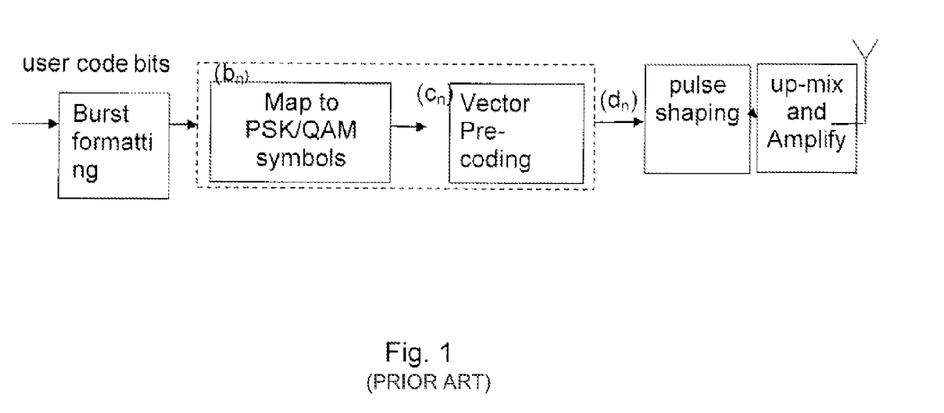
FIG. 1 shows a high level view of an EGPRS/EGPRS2 linear modulator with vector pre-coding (Tx chain)

Despite the fact that Global System for Mobile Communication (GSM) networks have been commercially deployed for almost two decades, interest on the continued improvement of the GSM/Enhanced Data rates for GSM Evolution (EDGE) technology has not dwindled. Network equipment manufacturers, mobile equipment manufacturers and telecom operators continue to develop the GSM system further. Improvements to the hardware/spectral efficiencies for both voice and packet data services are being actively sought. To this end, precoded EGPRS/EGPRS phase 2 (EGPRS2) has been proposed. Precoding involves transformation of the symbol sequence using some suitable transform. Typically a Fourier Transformation is used. FIG. 1 gives a high level view of precoded EGPRS/EGPRS2.

The blocks within the dashed box in FIG. 1 will now be described. After burst formatting, the bit sequence ($b_n$) has the following structure.

$$\left( \underbrace{b_1, \ldots, b_\alpha}_{guard}, \underbrace{b_{\alpha+1}, \ldots, b_\beta}_{tail}, \underbrace{b_{\beta+1}, \ldots, b_\gamma}_{data}, \right.$$
$$\left. \underbrace{b_{\gamma+1}, \ldots, b_\delta}_{training}, \underbrace{b_{\delta+1}, \ldots, b_\varepsilon}_{data}, \underbrace{b_{\varepsilon+1}, \ldots, b_\varphi}_{tail}, \underbrace{b_{\varphi+1}, \ldots, b_\phi}_{guard} \right)$$

These bits are mapped to symbols drawn from a Phase Shift Keying (PSK)/Quadrature Amplitude Modulation (QAM) symbol constellation. The letters s, x, t, g will be used to denote PSK/QAM symbols that carry training, payload, tail or guard bits respectively. Thus, $(b_1, \ldots, b_\alpha, b_{\phi+1}, \ldots, b_\phi) \to \vec{g} = (g_1, \ldots, g_\eta)$(guard)

$(b_{\alpha+1}, \ldots, b_\beta, b_{\varepsilon+1}, \ldots, b_\varphi) \to \vec{t} = (t_1, \ldots, t_\nu)$(tail)

$(b_{\beta+1}, \ldots, b_\gamma, b_{\delta+1}, \ldots, b_\varepsilon) \to \vec{x} = (x_1, \ldots, x_D)$(payload)

$(b_{\gamma+1}, \ldots, b_\delta) \to \vec{s} = (s_1, \ldots, s_{N_{tr}})$(training symbols), where $\eta$ is the total number of guard symbols, $\nu$ is the total number of tail symbols, D is the total number of payload symbols and $N_{tr}$ is the number of training symbols. The total number of payload plus training symbols is $N=D+N_{tr}$ and the total number of symbols in the burst is $K=N+\eta+\nu$.

The output of the symbol mapping block is the sequence of symbols $$[c_1, \ldots, c_K] \stackrel{def}{=} [\vec{g}, \vec{t}, \vec{x}, \vec{d}].$$

It is convenient to intercalate the training symbols and the payload symbols for synchronization and channel estimation purposes. A vector $\vec{z}$ of length N is constructed from the payload $\vec{x}$ and training symbols $\vec{s}$ accordingly.

$$\vec{z} = [z_1, \ldots, z_N]^T \stackrel{def}{=} [x_1, \ldots, s_1, \ldots, x_p, s_m, \ldots, s_{N_{tr}}, \ldots, x_D]$$
$$\qquad\quad \updownarrow \qquad \updownarrow \qquad \updownarrow \;\; \updownarrow \qquad \updownarrow \qquad \updownarrow$$
$$\qquad\quad k(1) \ldots n(1) \ldots k(p)\; n(m) \quad n(N_{tr}) \quad k(D)$$

The location of the training symbols is given by the indices $(n(m))_{m=1}^{N_{tr}}$. Likewise, the location of the payload symbols is given by $(k(m))_{m=1}^{D}$. That is, $z_{n(p)}=s_p$ and $z_{k(p)}=x_p$. The location of the training symbols should be chosen carefully as it has a large impact on the receiver performance. Discrete Fourier Transform (DFT)-precoding is applied to $\vec{z}$ to form a new sequence of complex numbers $\vec{Z}$ as follows. Let W be the Fourier transform matrix of size N×N whose entry in the m-th row and i-th column is $$W_{m,i} \stackrel{def}{=} \frac{1}{\sqrt{N}} \exp(-j2\pi(m-1)(i-1)/N), \text{ for } 1 \le m, i \le N.$$

The pre-coding operation is $\vec{Z}=W^H \cdot \vec{z}$.

Multiplication by the matrix $W^H$ can be implemented efficiently using the fast Fourier transform. Next, an integer $L \ge 0$ is chosen and the last L terms in $\vec{Z}$ are appended at the beginning of $\vec{Z}$ to form a new vector $\vec{Z}^P$. In other words, a cyclic prefix of length L is added. For example the values L=0 (no prefix) or L=5 (typical GSM channel length) may be used. Using vector notation, the precoded symbols with the cyclic prefix added are $$\vec{Z}^P = [Z_1^P, \ldots, Z_{N+L}^P] \stackrel{def}{=} [Z_{N-L}, Z_{N-L+1}, \ldots, Z_N, Z_1, Z_2, \ldots, Z_N].$$

The output of the vector precoding (IDFT) block is the sequence of complex numbers $[d_1, d_2, \ldots,$ $$d_K] \stackrel{def}{=} \left[ \underbrace{g_1, \ldots}_{guard}, \underbrace{t_1, \ldots}_{tail}, \underbrace{Z_1^P, Z_2^P, \ldots, Z_{N+L}^P}_{payload+pilots}, \underbrace{\ldots, t_\nu}_{tail}, \underbrace{\ldots, g_\eta}_{guard} \right].$$

This sequence is upsampled, filtered, upmixed, amplified and sent to the air using a linear modulator such as the EDGE modulator used in a GSM/EDGE Base Transceiver Station (BTS).

In EGRPS and EGPRS2 the modulation used is not known at the receiver and must be detected. This procedure is called blind detection of modulation. In particular, in EGPRS/EGPRS2, the modulation used is signalled through rotation of the transmitted symbols. Different rotation angles correspond to different modulation types (e.g. $3\pi/8$ for 8PSK, $\pi/4$ for 16QAM, $-\pi/4$ for 32 QAM are used in EGPRS2-A).

One of the main drawbacks of precoded EGPRS is that the Peak to Average Power Ratio (PAPR) of the transmitted signal is very large.

It is known that it is possible to use different training sequences in order to reduce PAPR. The method can be summarized as follows. A finite set of M training sequences is designed and fixed. For any given burst, M different transmit signals are generated, all sharing the same payload, but differing in the training sequence. Of the M generated transmit signals, the one with the lowest PAPR is chosen, and it is transmitted over the air. The other M−1 signals are discarded and are not transmitted. At the receiver side, the receiver uses blind detection in order to estimate the training sequence that was actually used among the possible M training sequences. This is also described in Orthogonal Pilot Sequences for Peak-to-Average Power Reduction in OFDM, M. J. Fernandez-Galatino, J. M. Paez-Borrallo, O. Edfors, Vehicular Technology Conference, 2001. VTC 2001 Fall. IEEE VTS 54th.

A problem with this method is that M different transmit signals must be generated at the transmitter. The computation of each signal requires either memory resources (e.g. by pre-computing and saving in memory the Inverse Discrete Fourier Transform (IDFT) of the M training sequences) or computational resources (e.g. by computing the Inverse Discrete Fourier Transform of each of the M different transmitted signals).

These computations required for PAPR reduction might seem like a minor issue. However, it is a fact that a significant number of installed GSM/EDGE base stations worldwide are old. Therefore, any increase in memory usage and/or computational complexity must be kept to a minimum in order to make precoded EGPRS/EGPRS2 backwards compatible with legacy base station hardware.

SUMMARY

Embodiments herein provide blind detection of the modulation technique in EGPRS/EGPRS2. Thus, embodiments herein avoid introducing additional signaling in precoded EGPRS/EGPRS2. Also, the receiver detects whether EGPRS/EGPRS2 or precoded EGPRS/EGPRS2 is being used for each radio block, as well as the modulation type used.

Accordingly, it is an object of the present invention to provide an improved method and arrangement for transmitting precoded EGPRS.

It is another object of the present invention to achieve a method and arrangement for reducing and minimizing the memory usage and/or the computational complexity when introducing precoded EGPRS/EGPRS2.

At least one of the above objects is achieved by a method and arrangement where signalling of the modulation type by means of rotation of the training sequence and PAPR reduction are combined into one single step. For each modulation type, a set of rotation angles is chosen. These sets have no element in common. New training sequences are generated by rotating one original training sequence. The rotation angle that minimizes the PAPR of the transmit signal is chosen. At the receiver side, knowing the original training sequence, the receiver estimates blindly the rotation angle among the known possible rotation angles. The estimated rotation angle in the receiver maps to a unique modulation type.

In accordance with embodiments described herein a set of rotation angles are calculated that allow PAPR reduction in a computationally efficient way. The proposed technique require only one Inverse Discrete Fourier Transformation (IDFT) computation, independently of the number of rotation angles, or equivalently, independently of the number of training sequences used for PAPR reduction. This results in significant savings in either memory or Central Processor Unit (CPU) cycles (or both) in the transmitter. Moreover, the set of possible rotation angles is large. Hence, the rotation angles can be properly chosen in order to minimize PAPR and maximize the probability of correct blind detection.

In accordance with one embodiment a method of transmitting a pre-coded EGPRS/EGPRS2 symbol sequence is provided, where the symbol sequence comprises data sequence symbols and training sequence symbols. In accordance with the method a modulation method is selected and a set of rotation angles are set in response to the selected modulation. The sets of rotation angles for each selectable modulation method have no element (rotation angle) in common. Further, a set of training sequences is generated from one original training sequence by rotating the original training sequence by the angles of the set of rotation angles associated with the selected modulation method, and a rotation angle from the set of rotation angles of the selected modulation method is selected. Finally the EGPRS/EGPRS2 symbol sequence is pre-coded and transmitted using the selected modulation method with the training symbol sequence rotated using the selected rotation angle. On the receiver side the receiver can receive such a transmitted symbol sequence using blind detection and knowledge of the original symbol sequence because each rotational angle is unique to a used modulation method.

In accordance with one embodiment the rotation angle is selected such that the peak to average power ratio of the transmitted precoded signal is minimized among the peak to average power ratio of all precoded signals generated from the user data and the and the set of training sequences.

In accordance with one embodiment all the angles in the sets of possible rotation angles are integer multiples of $2\pi$ divided by the total number of precoded data and training symbols.

In accordance with one embodiment the precoded signals are generated by adding a vector of precoded symbols to circular shifts of the vector of precoded training symbols.

A first advantage of the proposed blind detection method is that blind detection and PAPR reduction are combined into one single step, in a computationally efficient way.

A second advantage is the efficient algorithm to perform DFT-precoding and PAPR reduction that allows saving in either Central Processor Unit (CPU) cycles, or memory, or both. Some legacy GSM/EDGE base stations have been in operation for more than 10 years, and have undergone numerous software upgrades. Therefore, the amount of computational resources available for any new functionality in legacy base stations may be very limited. Hence, any savings in computational complexity/memory are of the utmost importance. Since it is desired to upgrade legacy base stations so that they can support precoded EGPRS/EGPRS2, every extra byte of memory and every extra CPU cycle are critical.

Embodiments herein also extend to methods of receiving a symbol sequence transmitted in accordance with the above using blind detection. Thus in accordance with one embodiment a method of receiving a pre-coded EGPRS/EGPRS2 symbol sequence, where the symbol sequence comprising data sequence symbols and training sequence symbols is provided. In accordance with the method first a symbol sequence having a rotated training symbol sequence is received wherein the rotation of the training symbol sequence uniquely identifies the used modulation method. Knowing the original, unrotated training symbol sequence, the receiver then blindly detects the received symbol sequence and determining the modulation method of the received symbol sequence by determining the rotation angle of the training sequence.

Embodiments herein further extend to a transmitter and a receiver arranged to perform the methods as described herein. The transmitter and receiver can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

FIGURES

The invention will now be described in more detail by way of non-limiting examples and with reference to the accompanying drawings, in which.

DETAILED DESCRIPTION

The column vector of transmitted complex-valued symbols $\vec{x}$ of length N consists of both payload and training symbols. It can be written in the form $$\vec{x} = \vec{d} + \vec{t}. \tag{1}$$

Here $\vec{d}$ is a vector of length N consisting only of user data symbols or zeros. Each entry is either 0 or a complex-valued data symbol. Similarly, the vector $\vec{t}$ of length N consists of training symbols or zeros only.

Let W be the DFT matrix of size N×N. The column vector of transmitted complex-valued symbols $\vec{x}$ of length N is precoded by multiplying it with the IDFT matrix.

$$\vec{X} = W^H \cdot \vec{x}. \tag{2}$$

Assume that there are P possible modulation types. (E.g. P=3 if 8PSK, 16QAM, 32QAM modulations are used.) Suppose also that M different rotations are used for each modulation type. A total of P×M different angles are chosen and grouped into P sets:

$$\Psi_1 = \{\theta_1^1, \ldots, \theta_1^M\}, \ldots, \Psi_P = \{\theta_P^1, \ldots, \theta_P^M\}. \tag{3}$$

Each angle is of the form $$\theta_p^m = \frac{2\pi \cdot k_{m,p}}{N}, 1 \leq p \leq P, 1 \leq m \leq M, \tag{4}$$

where $k_{m,p}$ is an integer, and $0 \leq k_{m,p} < N$.

For any angle θ define the rotation matrix $$R(\theta) = \text{diag}(1, e^{j\theta}, e^{j2\theta}, \ldots, e^{j(N-2)\theta}, e^{j(N-2)\theta}). \tag{5}$$

This is a diagonal matrix of size N×N.

If the signal to be transmitted has the p-th modulation type, 1≤p≤P, then M precoded transmit vectors are computed as follows. First the rotated training sequence is added to the vector of data symbols.

$$\vec{x}(\theta_p^m) = \vec{d} + R(\theta_p^m) \cdot \vec{t}, 1 \leq m \leq M. \tag{6}$$

The candidates for the precoded transmit vectors are simply $$\vec{X}(\theta_m^p) = W^H \cdot \vec{x}(\theta_m^p), 1 \leq m \leq M. \tag{7}$$

Let PAPR($\vec{X}$) denote the PAPR of a modulated signal built from the precoded transmit symbols $\vec{X}$. The optimum rotation angle is computed as $$\theta_{opt} = \underset{\theta_p^m : 1 \leq m \leq M}{\text{argmin}} PAPR(\vec{X}(\theta_p^m)). \tag{8}$$

The transmitted signal is then $\vec{X}(\theta_{opt})$. The other signals are discarded and are not transmitted.

Figure 2:
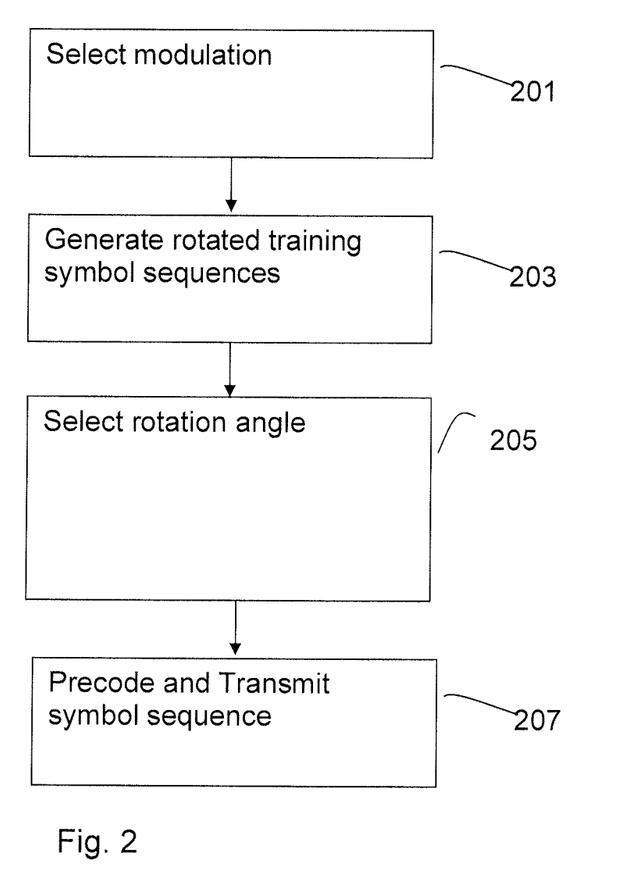
FIG. 2 is a flow chart illustrating some procedural steps performed when transmitting a pre-coded EGPRS/EGPRS2 symbol sequence.

In FIG. 2 a flowchart illustrating some steps performed when transmitting an EGPRS/EGPRS2 symbol sequence comprising data symbols and training symbols. First, in a step 201 a modulation method is selected and also a set of rotation angles set in response to the selected modulation. The sets of rotation angles for each selectable modulation method do no element in common, which will ensure that the modulation method can be determined by a receiver using blind detection. Next in a step 203, a set of training sequences is generated from one original training sequence by rotating the original training sequence by the angles of the set of rotation angles associated with the selected modulation method. Then in a step 205, a rotation angle from the set of rotation angles of the selected modulation method is selected. Finally, in a step 207, the transmitter pre-codes and transmits the EGPRS/EGPRS2 symbol sequence using the selected modulation method and rotating the training symbol sequence using the selected rotation angle. Thus, the training symbol sequence is transmitted using a rotation angle that uniquely identifies the modulation type since the angles in the different sets of angles for each selectable modulation method have no element in common, i.e. the same angle cannot be found in two different sets. Hereby the receiver can, using blind detection and knowledge of the original training symbol sequence, determine the selected modulation method by blind detection of the rotation angle associated with a received EGPRS/EGPRS2 training symbol sequence and demodulate the received symbol sequence. This is thus made possible by assigning mutually different rotation angles to all possible modulation methods and rotated original training symbols sequences.

Figure 3:
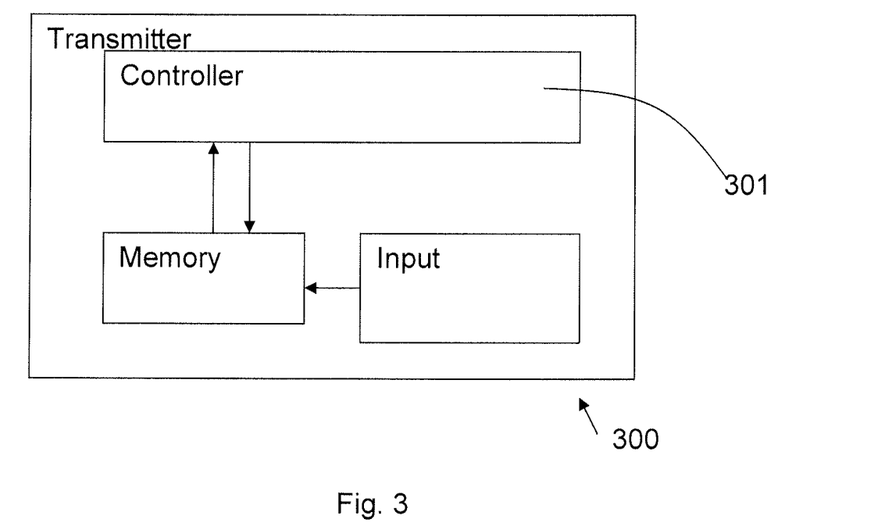
FIG. 3 illustrates a transmitter.

In FIG. 3 a transmitter 300 configured to transmit an EGPRS/EGPRS2 burst in accordance with the methods described herein is depicted. The transmitter 300 comprises controller circuitry 301 for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

At the receiver side the receiver estimates the most likely rotation angle $\hat{\theta}$ among all the P×M possible angles (3). Since there exists only one $\bar{p}$ such that $\hat{\theta} \in \Psi_{\bar{p}}$, then this $\bar{p}$ indicates the modulation type.

Figure 4:
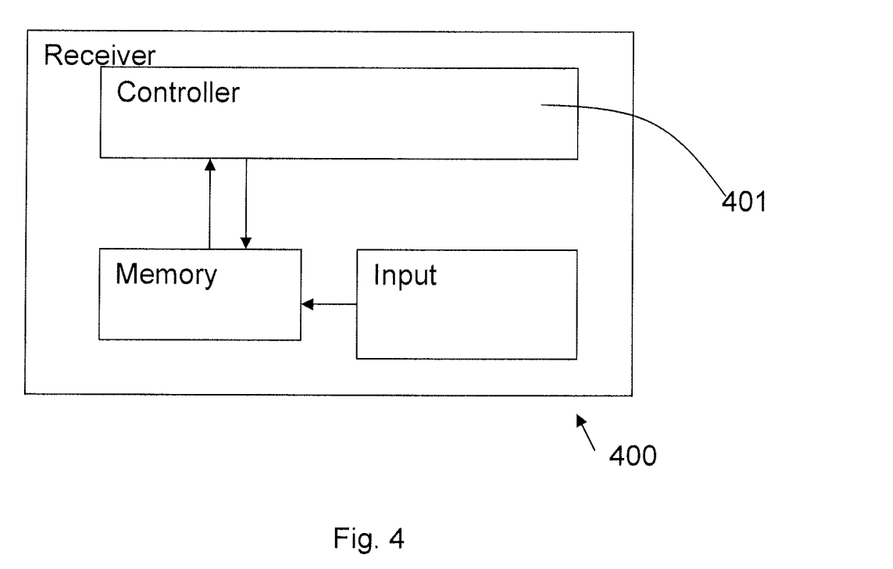
FIG. 4 illustrates a receiver.

In FIG. 4 a receiver 400 configured to receive an EGPRS/EGPRS2 burst transmitted in accordance with the methods described herein is depicted. The transmitter 400 comprises controller circuitry 401 for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

Next, it is explained how the computation of the optimum rotation angle in (8) can be performed with only one Fourier transform. Define $$\vec{D} = W^H \cdot \vec{d}, \qquad (9)$$

$$\vec{T} = W^H \cdot \vec{t}. \qquad (10)$$

Also define the circular shift function by m steps that applied to a vector $\vec{t}$ of length N removes the last m entries and places them at the beginning. That is, $$\begin{aligned} circshift(\vec{t}, m) &= circshift((t_0, t_1, \ldots, t_{N-1}), m) \\ &= (t_{N-m}, \ldots, t_{N-1}, t_0, t_1, \ldots, t_{N-m-1}). \end{aligned} \qquad (11)$$

For each angle $\theta_p^m$, $1 \leq m \leq M$ the candidate signal must be computed $$\vec{X}(\theta_p^m) = W^H \cdot \vec{x}(\theta_p^m) = W^H \cdot (\vec{d} + R(\theta_p^m) \cdot \vec{t}) = W^H \cdot \vec{d} + W^H \cdot R(\theta_p^m) \cdot \vec{t} \qquad (12)$$

However, by the shift property of the Inverse Discrete Fourier Transform and due to the definition (4) of the rotation angles, it can be shown that $$W^H \cdot R(\theta_p^m) \cdot \vec{t} = circshift(W^H \cdot \vec{t}, N - k_{m,p}). \qquad (13)$$

Using (9), (10) and (13) we may re-write (12) in the form $$\vec{X}(\theta_p^m) = \vec{D} + circshift(\vec{T}, N - k_{m,p}). \qquad (14)$$

Thus, the precoded signals can be generated by adding the vector of precoded symbols to circular shifts of the vector of precoded training symbols. Note that a circular shift requires no operations and can be trivially implemented using circular pointer arithmetic. Moreover, the vector $\vec{T}$ may be pre-computed and stored in memory. Thus, only one IDFT needs to be performed. A straightforward calculation of (8) requires roughly M times more arithmetic operations than an efficient computation based on (14). Alternatively, a straightforward implementation of (8) requires roughly M times more memory than an efficient implementation based on (14).

Finally, note that the remarkable reduction in computational complexity in (14) is due to the fact that the different training sequences are generated by rotation of one original training sequence, and that the rotation angles are of the special form (4). The reduction in complexity is not possible in general if arbitrary training sequences are used.

Figure 5:
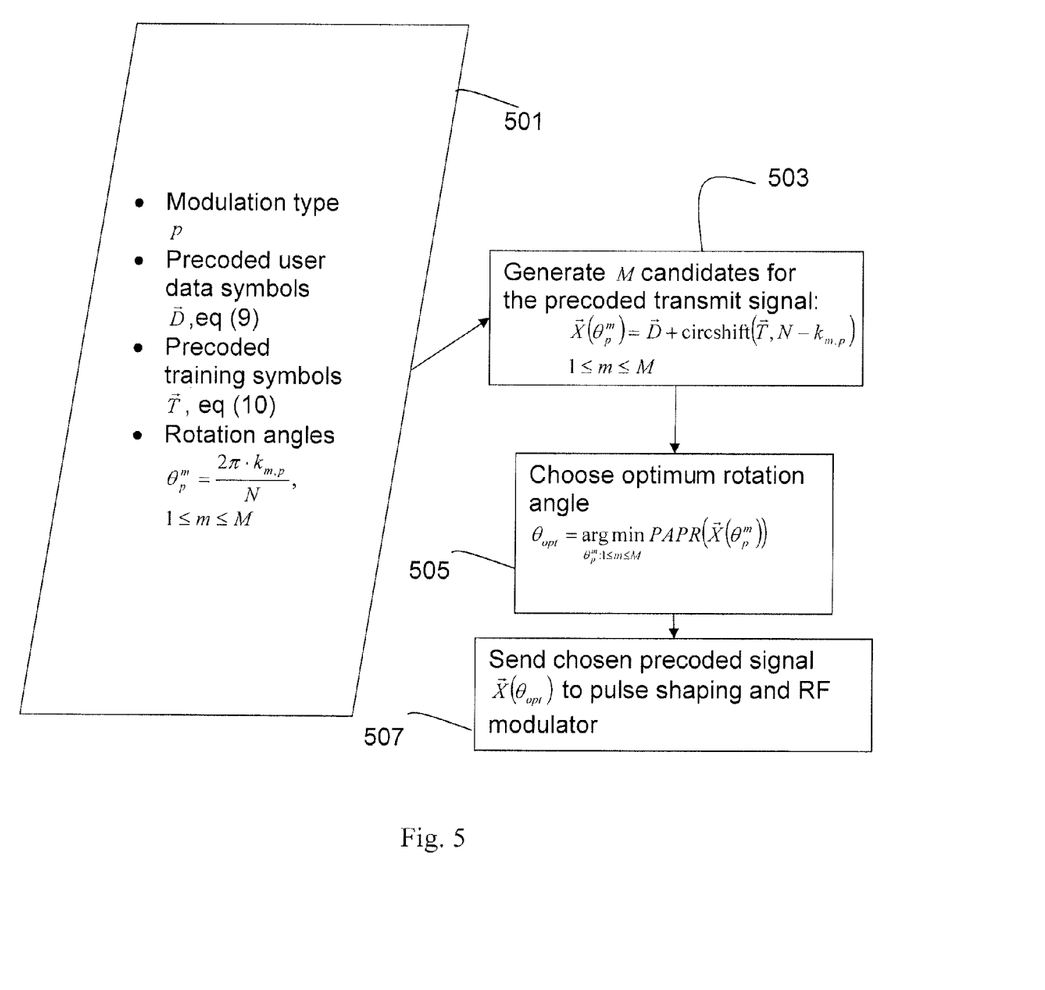
FIG. 5 is a flow chart illustrating steps performed when transmitting pre-coded EGPRS/EGPRS2 symbol sequence.

The precoding, modulation signaling and PAPR reduction process is illustrated in FIG. 5. First in a step 501, a desired modulation type, precoded user symbols, precoded training symbols and a predefined collection of M rotation angles constitute the input to the modulation signaling and PAPR reduction algorithm. In a second step 503, M candidate precoded signals are generated by addition of the precoded data symbols and circularly shifted versions of one precoded training sequence, each circular shift corresponding to one rotation angle. In a third step 505, the rotation angle that yields the precoded signal with the smallest PAPR is chosen among the M candidate rotation angles. In the last step 507, the precoded signal that yields the smallest PAR is pulse shaped and sent to the RF modulator to be transmitted through the air.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of transmitting a pre-coded Enhanced General Packet Radio Service (EPGRS)/EPGRS phase 2 (EGPRS2) symbol sequence, the symbol sequence comprising data sequence symbols and training sequence symbols, the method comprising:
   selecting a modulation method and a set of rotation angles corresponding to the selected modulation method, wherein sets of rotation angles corresponding to different modulation methods have no rotation angle in common, and wherein all the angles in said set of rotation angles are integer multiples of $2\pi$ divided by the total number of precoded data and training symbols;
   generating a set of training sequences from one original training sequence by rotating the original training sequence by the angles in said set of rotation angles;
   selecting a rotation angle from said set of rotation angles; and
   pre-coding and transmitting the EGPRS/EGPRS2 symbol sequence using the selected modulation method and rotating the training symbol sequence using the selected rotation angle.

2. The method of claim 1, wherein selecting a rotation angle from said set of rotation angles comprises selecting the rotation angle corresponding to a candidate precoded EGPRS/EGPRS2 symbol sequence with the minimum peak to average power ratio among the peak to average power ratios of multiple candidate precoded EGPRS/EGPRS2 symbol sequences generated from the data sequence symbols and the set of training sequences.

3. The method of claim 2, wherein the candidate precoded EGPRS/EGPRS2 symbol sequences are generated by adding a vector of precoded symbols to circular shifts of a vector of precoded training symbols.

4. The method of claim 1, wherein selecting a rotation angle comprises:
generating candidate precoded EGPRS/EGPRS2 symbol sequences from the data sequence symbols and the training sequences in the set of training sequences;
determining the peak to average power ratio of each candidate precoded EGPRS/EGPRS2 symbol sequence; and
selecting the rotation angle corresponding to the candidate precoded EGPRS/EGPRS2 symbol sequence with the lowest determined peak to average power ratio.

5. A transmitter for transmitting a pre-coded Enhanced General Packet Radio Service (EPGRS)/EPGRS phase 2 (EGPRS2) symbol sequence, the symbol sequence comprising data sequence symbols and training sequence symbols, the transmitter comprising controller circuitry configured to:
select a modulation method and a set of rotation angles corresponding to the selected modulation method, wherein sets of rotation angles corresponding to different modulation methods have no rotation angle in common, and wherein all the angles in said set of rotation angles are integer multiples of $2\pi$ divided by the total number of precoded data sequence and training sequence symbols;
generate a set of training sequences from one original training sequence by rotating the original training sequence by the angles in said set of rotation angles;
select a rotation angle from said set of rotation angles; and
pre-code and transmit the EGPRS/EGPRS2 symbol sequence using the selected modulation method and rotating the training symbol sequence using the selected rotation angle.

6. The transmitter of claim 5, wherein the transmitter is configured to select the rotation angle corresponding to a candidate precoded EGPRS/EGPRS2 symbol sequence with the minimum peak to average power ratio among the peak to average power ratios of multiple candidate precoded EGPRS/EGPRS2 symbol sequences generated from the data sequence symbols and the set of training sequences.

7. The transmitter of claim 6, wherein the transmitter is configured to generate the candidate precoded EGPRS/EGPRS2 symbol sequences by adding a vector of precoded symbols to circular shifts of a vector of precoded training symbols.

8. The transmitter of claim 5, wherein the transmitter is configured to select the rotation angle by:
generating candidate precoded EGPRS/EGPRS2 symbol sequences from the data sequence symbols and the training sequences in the set of training sequences;
determining the peak to average power ratio of each candidate precoded EGPRS/EGPRS2 symbol sequence; and
selecting the rotation angle corresponding to the candidate precoded
EGPRS/EGPRS2 symbol sequence with the lowest determined peak to average power ratio.

9. A method of receiving a pre-coded Enhanced General Packet Radio Service (EPGRS)/EPGRS phase 2 (EGPRS2) symbol sequence, the symbol sequence comprising data sequence symbols and training sequence symbols, the method comprising:
receiving a precoded EGPRS/EGPRS2 symbol sequence including a rotated training symbol sequence, the rotation of the training symbol sequence uniquely identifying the modulation method used for the received symbol sequence; and
knowing the original, unrotated training symbol sequence, blindly detecting the received symbol sequence and determining the modulation method of the received symbol sequence by determining the rotation angle of the training symbol sequence;
wherein said blindly detecting comprises blindly detecting rotation angles from sets of rotation angles corresponding to different modulation methods, wherein the sets of rotation angles corresponding to different modulation methods have no rotation angle in common, and wherein all angles in the sets are integer multiples of $2\pi$ divided by the total number of precoded data sequence and training sequence symbols.

10. The method of claim 9, wherein the received symbol sequence comprises a vector of precoded symbols added to circular shifts of a vector of precoded training symbols.

11. A receiver for receiving a pre-coded Enhanced General Packet Radio Service (EPGRS)/EPGRS phase 2 (EGPRS2) symbol sequence, the symbol sequence comprising data sequence symbols and training sequence symbols, the receiver comprising controller circuitry configured to:
receive a precoded EGPRS/EGPRS2 symbol sequence including a rotated training symbol sequence, the rotation of the training symbol sequence uniquely identifying the modulation method used for the received symbol sequence; and
knowing the original, unrotated training symbol sequence, blindly detect the received symbol sequence and determine the modulation method of the received symbol sequence by determining the rotation angle of the training symbol sequence;
wherein to blindly detect the received symbol sequence, the controller circuitry is configured to blindly detect rotation angles from sets of rotation angles corresponding to different modulation methods, wherein the sets of rotation angles corresponding to different modulation methods have no rotation angle in common, and wherein all angles in the sets that are integer multiples of $2\pi$ divided by the total number of precoded data sequence and training sequence symbols.

12. The receiver of claim 11, wherein the received symbol sequence comprises a vector of precoded symbols added to circular shifts of a vector of precoded training symbols.

* * * * *

UNITED STATES PATENT AND TRADEMARK OFFICE
CERTIFICATE OF CORRECTION

PATENT NO.         : 8,619,646 B2                                    Page 1 of 1
APPLICATION NO.    : 13/033123
DATED              : December 31, 2013
INVENTOR(S)        : Lopez et al.

It is certified that error appears in the above-identified patent and that said Letters Patent is hereby corrected as shown below:

On the Title Page, Item (75), under "Inventors", in Column 1, Line 3,
delete "Måarten" and insert -- Mårten --, therefor.

In the Claims

In Column 10, Line 50, in Claim 11, delete "that are" and insert -- are --, therefor.

Signed and Sealed this
Eighth Day of July, 2014

Michelle K. Lee
*Deputy Director of the United States Patent and Trademark Office*